(12) United States Patent
Ruschin et al.

(10) Patent No.: US 6,704,473 B2
(45) Date of Patent: Mar. 9, 2004

(54) SPATIAL MULTIPLEXING OF DEFLECTOR UNITS USING POLARIZATION DIVERSITY

(75) Inventors: Shlomo Ruschin, Herzlia (IL); Eyal Shekel, Jerusalem (IL); Michael Rudman, Jerusalem (IL)

(73) Assignee: Chiaro Networks Ltd., Jerusalem (IL)

( * ) Notice: Subject to any disclaimer, the term of this patent is extended or adjusted under 35 U.S.C. 154(b) by 14 days.

(21) Appl. No.: 09/896,119

(22) Filed: Jul. 2, 2001

(65) Prior Publication Data

US 2003/0002777 A1 Jan. 2, 2003

(51) Int. Cl.$^7$ .................................................. G02B 6/26
(52) U.S. Cl. .............................. 385/16; 385/18; 385/20
(58) Field of Search ............................... 385/16, 11, 36, 385/18, 20; 359/310, 311, 316, 320, 122, 129, 303, 304

(56) References Cited

U.S. PATENT DOCUMENTS

| | | |
|---|---|---|
| 4,805,977 A | 2/1989 | Tamura et al. |
| 4,924,321 A | 5/1990 | Miyagawa et al. |
| 4,969,720 A * | 11/1990 | Lins et al. .................. 359/302 |
| 5,162,944 A | 11/1992 | Yamamoto et al. ......... 359/247 |
| 5,317,445 A | 5/1994 | DeJule et al. |
| 5,381,250 A | 1/1995 | Meadows ..................... 359/39 |
| 5,606,439 A | 2/1997 | Wu |
| 5,663,736 A * | 9/1997 | Webb et al. ................. 342/375 |
| 5,771,320 A * | 6/1998 | Stone ........................... 385/16 |
| 6,134,031 A | 10/2000 | Nishi et al. .................... 359/15 |
| 6,212,310 B1 | 4/2001 | Waarts et al. |
| 6,404,538 B1 * | 6/2002 | Chen et al. .................. 359/323 |
| 6,424,756 B1 * | 7/2002 | Kalman et al. ............... 385/16 |
| 6,445,844 B1 * | 9/2002 | Neukermans et al. ......... 385/18 |

OTHER PUBLICATIONS

U.S. patent application Ser. No. 09/470,642, Shekel et al.

* cited by examiner

Primary Examiner—Drew Dunn
Assistant Examiner—Joshua L Pritchett
(74) Attorney, Agent, or Firm—Nixon & Vanderhye, P.C.

(57) ABSTRACT

Two N-channel deflector modules, both located in the same layer or plane of an assembly, direct polarized beams toward a polarization beam splitter. A half wave plate is interposed between one of the deflector modules and the polarization beam splitter. The polarization beam splitter combines the two beams into a single output beam, without loss of optical power, comprising 2N channels, each of which can carry a unique data stream. In alternate embodiments the group of two deflector modules and a polarization beam splitter can be stacked, optionally in combination with layers comprising a single deflector module and polarization beam splitter or mirror.

26 Claims, 3 Drawing Sheets

SPATIAL MULTIPLEXING OF DEFLECTOR UNITS USING POLARIZATION DIVERSITY

BACKGROUND OF THE INVENTION

1. Field of the Invention

This invention relates to optical deflection units. More particularly this invention relates to the use of optical polarization diversity to increase the capacity of a free-space steering unit.

2. Description of the Related Art

There are existing switching arrangements in which the polarization properties of light are relevant. U.S. Pat. No. 5,162,944 reveals a 1×2 switching device where an active polarization controller is used in order to direct polarized light through different optical paths into different output ports. U.S. Pat. No. 5,381,250 describes a more complex 2×2 space switch based on the same principle. This system is able to handle also unpolarized light by suitably splitting polarizations into orthogonal components and actively transforming the polarization state for each component. U.S. Pat. No. 6,134,031 discloses generalization of the principle of switching using active rotation of polarization. A plurality of units is stacked, thus increasing the size of the switch.

SUMMARY OF THE INVENTION

The invention described herein is useful in a one-dimensional scanning apparatus, enlarging capacity by a factor of about two. The technique of polarization diversity disclosed herein is also applicable to one or two-dimensional optical switches employing free-space scanning systems. The approach taken in the invention is the use of beams having two orthogonal polarizations.

In the embodiments disclosed herein, the polarization state of light is not actively altered. Polarization is combined in order to increase the capacity of optical space channels. The switching action is accomplished by steering the beam utilizing an additional physical means, such as mirror tilting or electro-optic deflection.

In some preferred embodiments of the invention beam steering in a single plane is employed. Two N-channel deflector modules, both located in the same layer or plane of an assembly, direct polarized beams in orthogonal polarization states toward a polarization beam splitter. In some embodiments, wherein both beams are linearly polarized in the same direction, a half wave plate is interposed between one of the deflector modules and the polarization beam splitter. The polarization beam splitter combines the two beams into a single output beam, comprising 2N channels, each of which can carry a unique data stream. In alternate embodiments the group of two deflector modules and a polarization beam splitter can be stacked, optionally in combination with layers comprising a single deflector module and polarization beam splitter or mirror.

It is therefore a primary object of some aspects of the present invention to provide an improved optical arrangement for switching a large number of optical channels that is simple to manufacture, conserving of real estate, and reliable.

It is another object of some aspects of the present invention to provide an improved optical switching arrangement that can be compactly installed in an integrated device that uses optical beam deflectors, such as an optical switch or scanner.

The invention provides an optical switching arrangement, including a first deflector module, a plurality of first optical deflectors that emit a first polarized collection of beams, a second deflector module, a plurality of second optical deflectors that emit a second polarized collection of beams. The arrangement further includes a polarization beam combiner that is disposed in a first light path of the first polarized collection of beams and in a second light path of the second polarized collection of beams. The polarization beam combiner combines the first polarized collection of beams and the second polarized collection of beams into an output beam, wherein the polarization axis of the first polarized collection of beams is orthogonal to the polarization axis of the second polarized collection of beams at the polarization beam combiner. The arrangement further includes an output receiver disposed in the output beam.

According to an aspect of the optical switching arrangement, the output receiver is an array of receivers.

An additional aspect of the optical switching arrangement includes optics disposed in the output beam for focusing the output beam on the output receiver.

According to a further aspect of the optical switching arrangement, the first deflector module and the second deflector module emit light each have an identical polarization and one of them has a half-wave polarization plate disposed in the first light path.

Still another aspect of the optical switching arrangement includes optics disposed in the output beam for focusing the output beam on the output receiver.

According to yet another aspect of the optical switching arrangement, the polarization of light emitted by the first deflector module is orthogonal to the polarization of light emitted by the second deflector module.

According to one aspect of the optical switching arrangement, the first polarized collection of beams includes a plurality of first optical channels, each of the first optical channels carrying information in a beam of a corresponding one of the first optical deflectors, and the second polarized collection of beams includes a plurality of second optical channels, each of the second optical channels carrying information in a beam of a corresponding one of the second optical deflectors, wherein at least two of the first optical channels and the second optical channels carry unique streams of information.

According to an additional aspect of the optical switching arrangement, the first deflector module has N first optical deflectors, the second deflector module has N second optical deflectors, and the output receiver has 2N receivers.

According to another aspect of the optical switching arrangement, at least a portion of the first light path may be perpendicular to a portion of the second light path.

According to a further aspect of the optical switching arrangement, the first deflector module, the second deflector module, the polarization beam combiner and the output beam define a first switching subassembly, which further includes a third deflector module having a plurality of third optical deflectors that emit a third polarized beam. A mirror disposed in a third light path of the third polarized beam reflects the third polarized beam toward the output receiver, the mirror and the third deflector module, defining a second switching subassembly, wherein the first switching subassembly and the second switching subassembly are stacked.

According to one aspect of the optical switching arrangement, the first deflector module has N first optical deflectors and the second deflector module has N second optical deflectors, the third deflector module has N third optical deflectors and the output receiver has 3N receivers.

According to yet another aspect of the optical switching arrangement, the first switching subassembly includes a plurality of first switching subassemblies, wherein the first switching subassemblies and the second switching subassembly are stacked.

According to still another aspect of the optical switching arrangement, the mirror includes a second polarization beam splitter.

The invention provides a method of optical switching, including the steps of deflecting a plurality of first polarized rays to define a first polarized collection of beams, and deflecting a plurality of second polarized rays to define a second polarized collection of beams, wherein each of the first polarized rays and the second polarized rays carries a unique stream of information. The method further includes using a combiner to combine the first polarized collection of beams with the second polarized collection of beams to produce an output beam that includes the first polarized rays and the second polarized rays, wherein the polarization of the first polarized rays is orthogonal to the polarization of the second polarized rays in the output beam. The method further includes receiving the output beam in a plurality of receivers, wherein each of the receivers receives one of the first polarized rays and the second polarized rays.

An aspect of the method includes focusing the output beam on the receivers.

A further aspect of the method includes adjusting the polarization axis of the first polarized collection of beams.

According to still another aspect of the method, the first polarized collection of beams has N rays, the second polarized collection of beams has N rays, and the receivers comprise 2N receivers.

According to yet another aspect of the method, the direction of at least a portion of the first polarized collection of beams is perpendicular to a the direction of a portion of the second polarized collection of beams.

An additional aspect of the method includes deflecting a plurality of third polarized rays to define a third polarized collection of beams, providing a reflector to reflect the third polarized collection of beams toward the receivers, and stacking the reflector and the combiner.

According to one aspect of the method, the first polarized collection of beams, the second polarized collection of beams, and the third polarized collection of beams each have N rays, and there are 3N receivers.

The invention provides an optical switching arrangement, including an output receiver, a plurality of stacked switching subassemblies, the stacked switching subassemblies producing a combined output beam directed toward the output receiver. Each of the stacked switching subassemblies has a first deflector module, which includes a plurality of first optical deflectors. The first deflector module emits a first polarized collection of beams. A second deflector module has a plurality of second optical deflectors, and emits a second polarized collection of beams. Each of the stacked switching subassemblies has a polarization beam combiner disposed in a first light path of the first polarized collection of beams and in a second light path of the second polarized collection of beams, which combines the first polarized collection of beams and the second polarized collection of beams into a common beam. The common beam forms a portion of the combined output beam, wherein a polarization of the first polarized collection of beams is orthogonal to a polarization of the second polarized collection of beams at the polarization beam combiner.

According to an aspect of the optical switching arrangement, the output receiver includes an array of receivers.

Yet another aspect of the optical switching arrangement includes optics disposed in the combined output beam for focusing the combined output beam on the output receiver.

According to still another aspect of the optical switching arrangement the first deflector module and the second deflector module emit light has an identical polarization includes a half-wave polarization plate disposed in the first light path.

According to one aspect of the optical switching arrangement, a polarization of light emitted by the first deflector module is orthogonal to a polarization of light emitted by the second deflector module.

According to another aspect of the optical switching arrangement, the first polarized collection of beams includes a plurality of first optical channels, each of the first optical channels carrying information in a beam of a corresponding one of the first optical deflectors. The second polarized collection of beams includes a plurality of second optical channels, each of the second optical channels carrying information in a beam of a corresponding one of the second optical deflectors, wherein at least two of the first optical channels and the second optical channels carry unique streams of information.

According to a further aspect of the optical switching arrangement, at least a portion of the first light path is perpendicular to a portion of the second light path.

BRIEF DESCRIPTION OF THE DRAWINGS

For a better understanding of these and other objects of the present invention, reference is made to the detailed description of the invention, by way of example, which is to be read in conjunction with the following drawings, wherein.

DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details. In other instances well-known circuits, and control logic, have not been shown in detail in order not to unnecessarily obscure the present invention.

Figure 1:
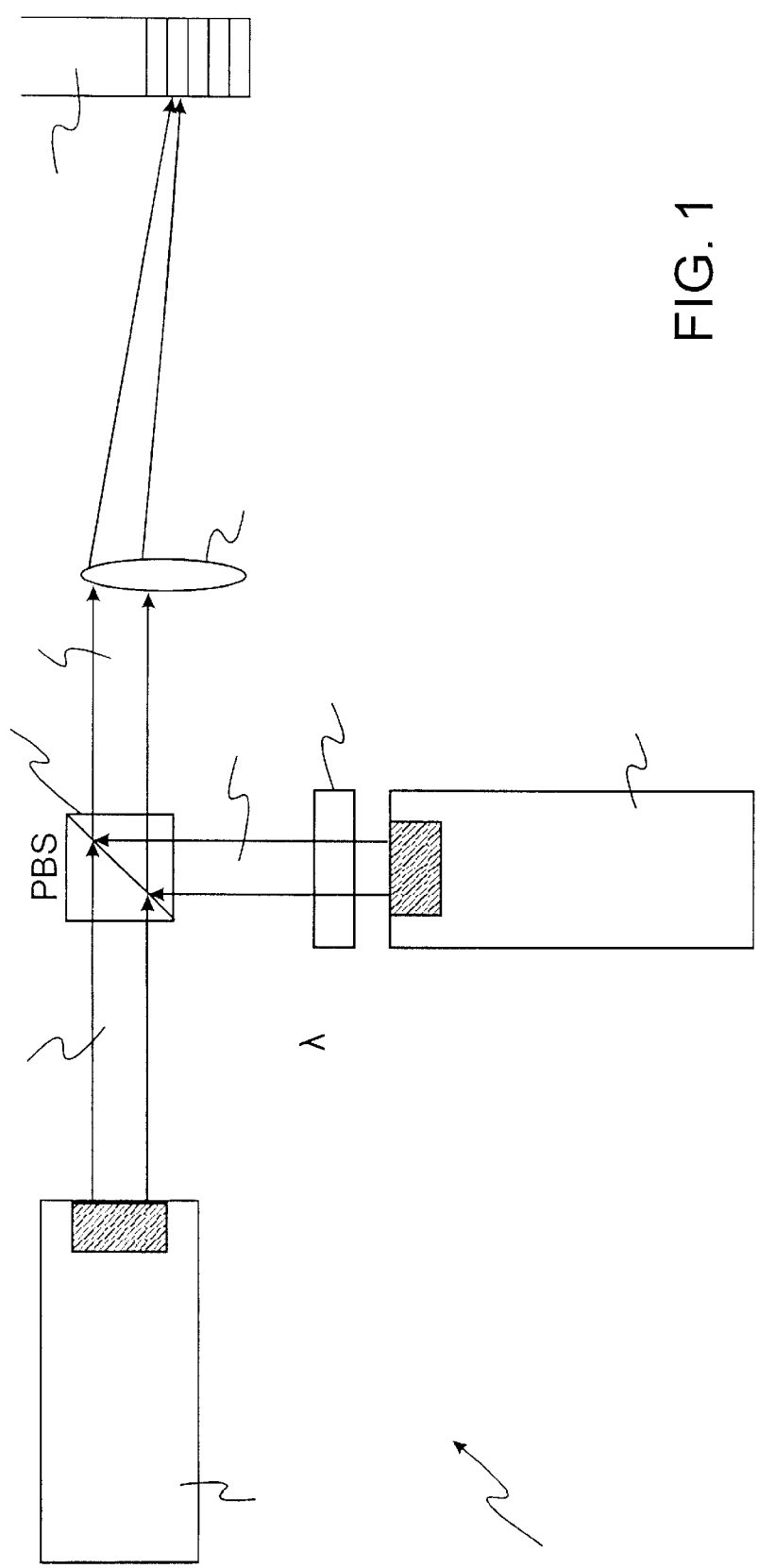
FIG. 1 schematically illustrates an optical switching arrangement in accordance with a preferred embodiment of the invention.

Turning now to the drawings, reference is made to FIG. 1, which schematically depicts an optical switching arrangement, which is constructed and operative in accordance with a preferred embodiment of the invention. A switching arrangement 10 includes a first deflector module 12 having N individual and independently addressed deflector elements, and a second deflector module 14 also having N deflector elements. The deflector modules 12, 14 are capable of varying the directions of the rays that are emitted by individual deflector elements, so that any ray can be directed to address a desired receiving element of an array of receivers. For example, the deflector modules 12, 14 can be the selectably directable optical beam deflectors which are disclosed in copending U.S. application Ser. No. 09/470, 642 of common assignee herewith, and hereby incorporated by reference. The switching arrangement 10 has an output array 16 comprising 2N optical receivers or detectors. A particular feature of the switching arrangement 10 is a conventional polarizing beam splitter (PBS) 18, which functions as a beam combiner, and is capable of unifying two beams having orthogonal polarization into a single beam without loss of power. A first polarized collection of beams 20 is emitted as a plurality of rays from the deflector elements of the first deflector module 12, and a second polarizing collection of beams 22 is emitted as a plurality of rays from the deflector elements of the second deflector module 14. In some embodiments, the polarization of the collection of beams 20 is linear and identical to the polarization of the collection of beams 22. In such a case, a half-wave polarizing plate 24 is interposed between the second deflector module 14 and the polarizing beam splitter 18. When the collections of beams 20, 22 arrive at the polarizing beam splitter 18, the collection of beams 20 has a polarization orthogonal to that of the collection of beams 22.

Figure 2:
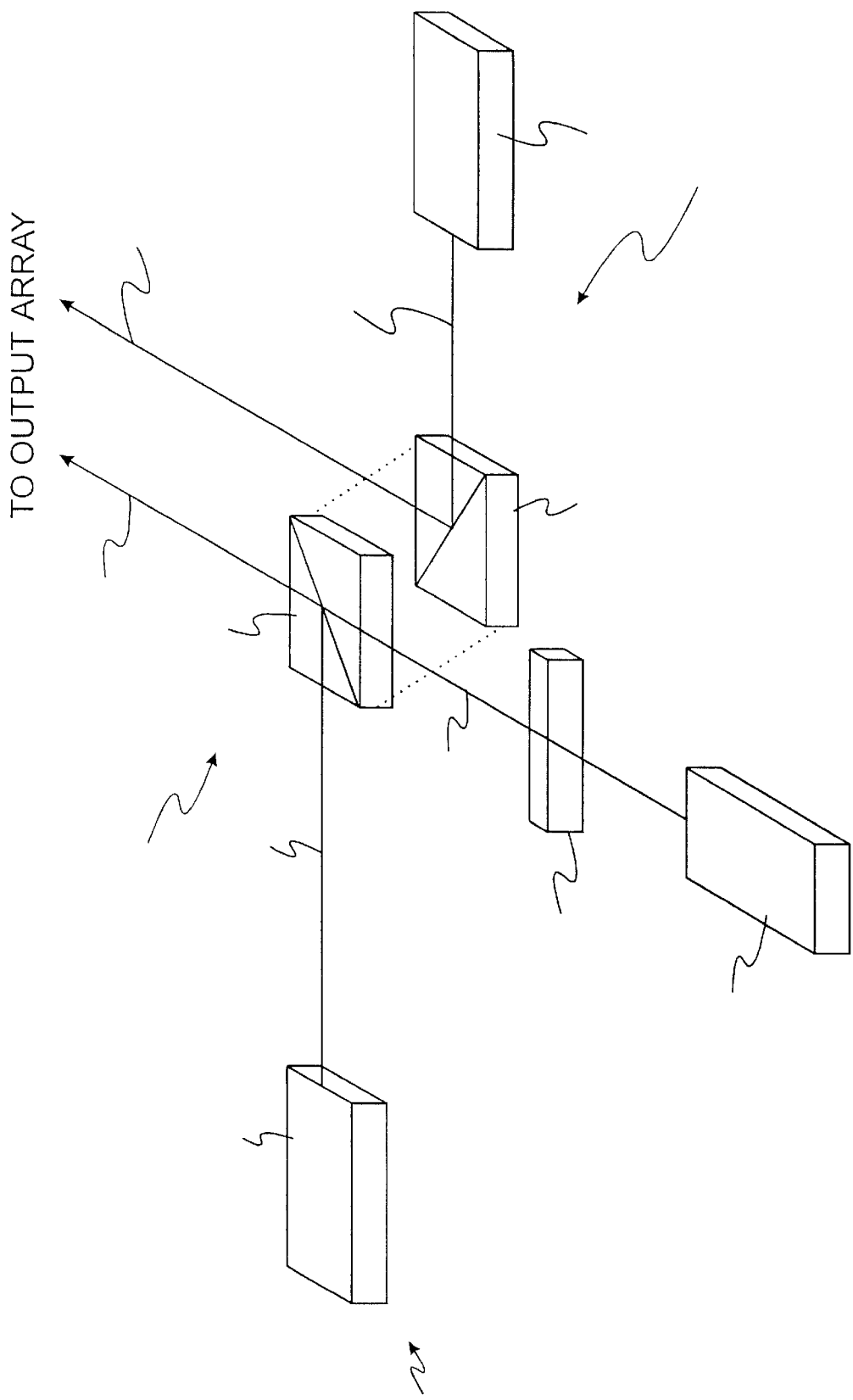
FIG. 2 schematically illustrates an optical switching arrangement in accordance with a first alternate embodiment of the invention.
Figure 3:
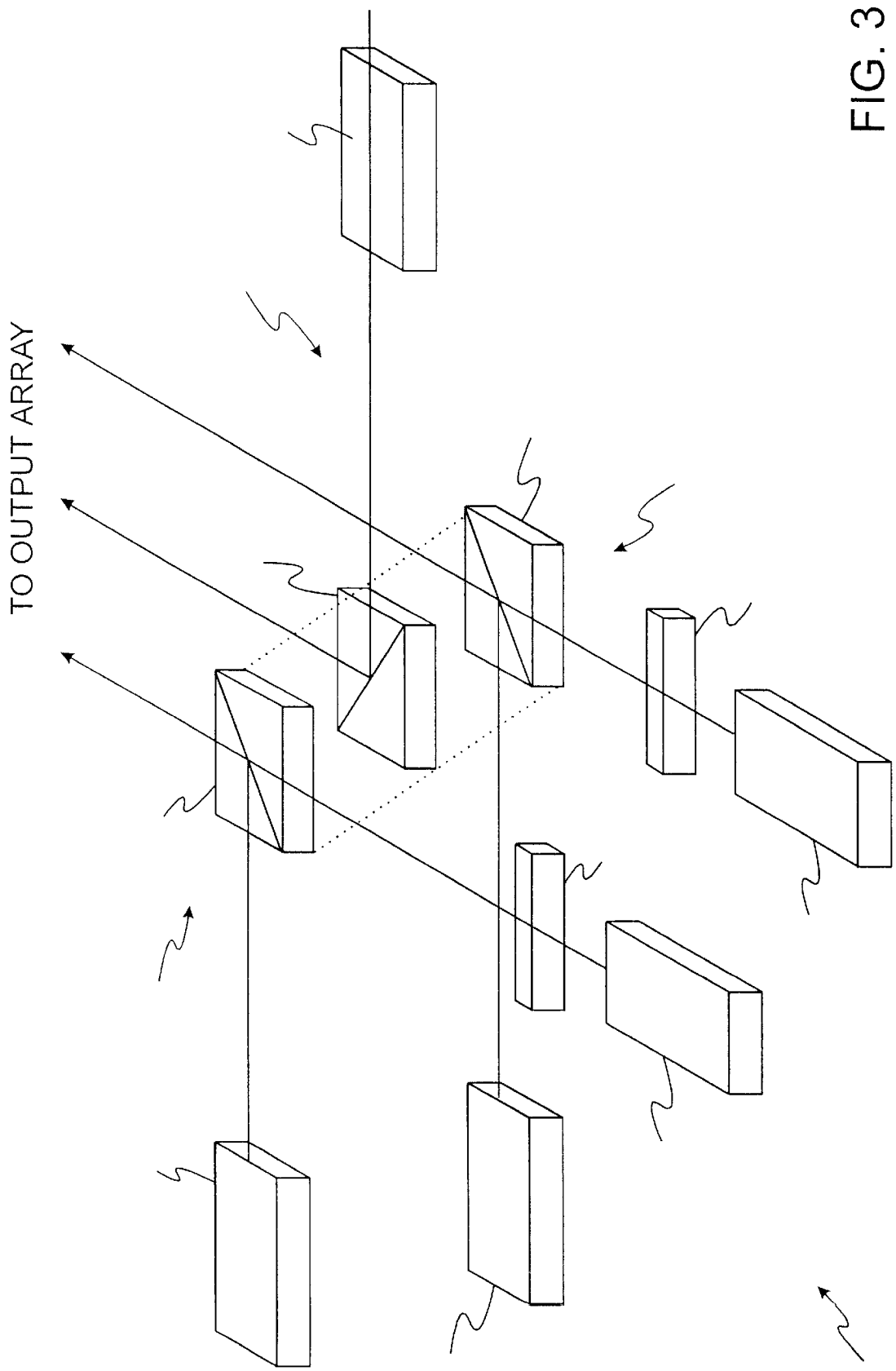
FIG. 3 schematically illustrates an optical switching arrangement in accordance with a second alternate embodiment of the invention.

In other embodiments, as depicted in FIGS. 2 and 3, the deflector modules 26, 28 can include intrinsic polarization optics such that their output beams have mutually orthogonal polarizations. In these embodiments, the polarizing plate can be omitted.

Returning to FIG. 1, the polarizing beam splitter 18 combines the collections of beams 20, 22 into a single combined beam 30. The beam 30 is suitably focused on the output array 16 by scanning optics 32. The collections of beams 20, 22 each carry N optical channels, all of which are in general directed in different angles towards the various receivers or detectors of output array 16 and may have unique information. The combined collection of beams 30 carries 2N optical channels.

In complex assemblies which are constructed in layers, the first deflector module 12, the second deflector module 14, and the polarizing beam splitter 18 form a switching subassembly and are disposed on the same layer or plane, for example on a silicon slab. The directions of the collections of beams 20, 22 may be mutually perpendicular.

This embodiment of FIG. 1 is particularly useful when the size and complexity of an optical assembly are such that the production, packaging or location of two separated deflector modules each having N deflectors is more convenient than a single deflector module having 2N deflectors. When compared to a design in which a deflector module consists of two stacked 1-dimensional arrays, replacement of the stack by two separate deflector modules reduces the depth of the deflector module assembly by 50 percent. As the deflector modules 12, 14 and their corresponding collections of beams 20, 22 share the same plane, the need to construct extra layers is eliminated, thus reducing manufacturing cost. Furthermore, the maximum diagonal dimension of the deflector modules 12, and the image of deflector 14 reflected by the mirror action of the polarizing beam splitter 18, is reduced, alleviating field size requirements of the scanning optics, and reducing spot size enlargement in the plane of the output array 16. Undesirable spot size enlargement results from uncorrected lens aberrations, principally affecting light originating from off-axis deflectors.

A further advantage of the embodiment of FIG. 1 can be appreciated in that the polarizing beam splitter 18 functions as a common output polarizer. An exit polarizer is often required in conventional designs in which the deflector action is polarization dependent. The exit polarizer is necessitated when polarization is not preserved along the light path due to imperfections and misalignments of the components. The need for such an exit polarizer has been eliminated in the embodiment of FIG. 1.

First Alternate Embodiment

Reference is now made to FIG. 2, which schematically illustrates a switching arrangement 34 that is constructed and operative in accordance with a first alternate embodiment of the invention. In this embodiment, stacking is allowed. The switching arrangement 34 includes a first N-element deflector module 26 and a second N-element deflector module 28. The deflector module 26 directs a first beam 36 to a polarization beam splitter 38. The deflector module 28 directs a second beam 40 through a half wave plate 42 to the polarization beam splitter 38. The polarization beam splitter 38 combines the beams 36, 40 into a first output beam 44. The polarization beam splitter 38, the deflector module 26, and the deflector module 28 are all located on an upper level 46.

A third N-channel input deflector unit 48 directs a third beam 50 to a mirror 52, which produces a reflected beam 54. For convenience of manufacture, the mirror 52 can be realized as a beam splitter that is identical to the polarization beam splitter 38. The input deflector unit 48 and the mirror 52 are disposed on a lower level 56, and the polarization beam splitter 38 is stacked above the mirror 52 in the Y- or vertical direction.

The switching arrangement 34 is capable of processing 3N channels, each carrying a unique data stream. It will be observed that one member of the stack, comprising the input deflector unit 48 and the mirror 52, does not employ polarization diversity. While the switching arrangement 34 has a larger vertical profile than does the switching arrangement 10 (FIG. 1), it has the advantage of being able to process a larger number of optical channels without consuming more real estate. In some embodiments it may be desirable to vertically space the mirror 52 apart from the polarization beam splitter 38 in order to allow for cooling and electrical connection access.

Second Alternate Embodiment

Reference is now made to FIG. 3, which schematically illustrates a switching arrangement 58 that is constructed and operative in accordance with a second alternate embodiment of the invention. The description of FIG. 3 is to be read in conjunction with FIG. 2. The second alternate embodiment is similar to the first alternate embodiment, except now there are three stacked levels, comprising an upper level 60, an intermediate level 62, and a lower level 64. The switching arrangement 58 is capable of processing 5N channels, each carrying a unique data stream. The second alternate embodiment may be operative without the lower level 64.

The upper level 60 includes two N-channel deflector units 66, 68 arranged to direct beams to a beam splitter 70, which have a coplanar arrangement identical to that of the deflector modules 26, 28, and the polarization beam splitter 38 (FIG. 2). An identical grouping of two N-channel deflector units 72, 74, and a beam splitter 76 is disposed in the lower level 64. Half-wave plates 78, 80 are provided to receive the beams that are output by the deflector units 68, 74. The intermediate level 62 carries an input deflector unit 82 and a mirror 84, which are arranged in the same manner as the input deflector unit 48 and the mirror 52 (FIG. 2). For convenience of manufacture, the mirror 84 can be realized as a beam splitter, such that the mirror 84, the beam splitter 70 and the mirror 84 are identical. It will be observed that the polarization diversity is employed in the upper level 60 and the lower level 64, but is not employed in the intermediate level 62.

While this invention has been explained with reference to the structure disclosed herein, it is not confined to the details set forth, and this application is intended to cover any modifications and changes as may come within the scope of the following claims:

What is claimed is:

1. An optical switching arrangement, comprising:
    an output beam receiver having a limited beam acceptance angular cone corresponding to a finite numerical aperture;
    a first deflector module, comprising a plurality of first optical deflectors that emits a first polarized collection of beams, said first polarized collection of beams carrying a first plurality of optical information carrying channels bearing first information, said first plurality of optical information carrying channels having a first total divergence;
    a second deflector module, comprising a plurality of second optical deflectors that emits a second polarized collection of beams, said second polarized collection of beams carrying a second plurality of optical information carrying channels, independent of and different from said first optical information carrying channels, bearing second information different from said first information, said second plurality of optical information carrying channels having a second total divergence, an algebraic sum of said first and second total divergences exceeding said limited beam acceptance angular cone corresponding to a finite numerical aperture of said output beam receiver; and
    a polarization beam combiner, disposed in a first light path of said first polarized collection of beams and in a second light path of said second polarized collection of beams that combines said first polarized collection of beams and said second polarized collection of beams into an output beam, wherein a first polarization of said first polarized collection of beams is orthogonal to a second polarization of said second polarized collection of beams at said polarization beam combiner, said output beam having a total divergence which does not exceed said limited beam acceptance angular cone corresponding to a finite numerical aperture of said output beam receiver and does not exceed the larger of said first total divergence and said second total divergence.

2. The optical switching arrangement according to claim 1, wherein said output receiver comprises an array of receivers.

3. The optical switching arrangement according to claim 1, further comprising optics disposed in said output beam for focusing said output beam on said output receiver.

4. The optical switching arrangement according to claim 1, wherein said first deflector module and said second deflector module emit light having an identical polarization, further comprising a half-wave polarization plate disposed in said first light path.

5. The optical switching arrangement according to claim 4, further comprising optics disposed in said output beam for focusing said output beam on said output receiver.

6. The optical switching arrangement according to claim 1, wherein a polarization of light emitted by said first deflector module is orthogonal to a polarization of light emitted by said second deflector module.

7. The optical switching arrangement according to claim 1, wherein said first deflector module has N first optical deflectors and said second deflector module has N second optical deflectors, and said output receiver has 2N receivers.

8. The optical switching arrangement according to claim 1, wherein at least a portion of said first light path is perpendicular to a portion of said second light path.

9. The optical switching arrangement according to claim 1, wherein said first deflector module, said second deflector module, and said polarization beam combiner and said output beam define a first switching subassembly, further comprising:
    a third deflector module comprising a plurality of third optical deflectors that emits a third polarized beam; and
    a mirror disposed in a third light path of said third polarized beam that reflects said third polarized beam toward said output receiver, said mirror and said third deflector module defining a second switching subassembly;
    wherein said first switching subassembly and said second switching subassembly are stacked.

10. The optical switching arrangement according to claim 9, wherein said first deflector module has N first optical deflectors and said second deflector module has N second optical deflectors, said third deflector module has N third optical deflectors and said output receiver has 3N receivers.

11. The optical switching arrangement according to claim 9, wherein said first switching subassembly comprises a plurality of first switching subassemblies;
    wherein said first switching subassemblies and said second switching subassembly are stacked.

12. The optical switching arrangement according to claim 11, wherein said mirror comprises a second polarization beam splitter.

13. A method of optical switching, comprising the steps of:
    providing a plurality of output beam receivers, each having a limited beam acceptance angular cone corresponding to a finite numerical aperture;
    deflecting a plurality of first polarized rays to define a first polarized collection of beams, said first polarized collection of beams carrying a first plurality of optical information carrying channels bearing first information, said first plurality of optical information carrying channels having a first total divergence;
    deflecting a plurality of second polarized rays to define a second polarized collection of beams, said second polarized collection of beams carrying a second plurality of optical information carrying channels, independent of and different from said first optical information carrying channels, bearing second information different from said first information, said second plurality of optical information carrying channels having a second total divergence, an algebraic sum of said first and second total divergences exceeding said limited beam acceptance angular cone corresponding to a finite numerical aperture of each of said output beam receivers;
    providing a combiner to combine said first polarized collection of beams with said second polarized collection of beams to produce an output beam that comprises said first polarized rays and said second polarized rays wherein a first polarization of said first polarized rays is orthogonal to a second polarization of said second polarized rays in said output beam, said output beam having a total divergence which does not exceed said limited beam acceptance angular cone corresponding to a finite numerical aperture of each of said output beam receivers and does not exceed the larger of said first total divergence and said second total divergence; and receiving said output beam in said plurality of receivers, wherein each of said receivers receives one of said first polarized rays and said second polarized rays.

14. The method of optical switching according to claim 13, further the step of focusing said output beam on said receivers.

15. The method of optical switching according to claim 13, further comprising the step of adjusting a polarization axis of said first polarized collection of beams.

16. The method of optical switching according to claim 13, wherein said first polarized collection of beams has N rays and said second polarized collection of beams has N rays, and said receivers comprise 2N receivers.

17. The method of optical switching according to claim 13, wherein a first direction of at least a portion of said first polarized collection of beams is perpendicular to a second direction of a portion of said second polarized collection of beams.

18. The method of optical switching according to claim 13, further comprising the steps of: deflecting a plurality of third polarized rays to define a third polarized collection of beams;

providing a reflector to reflect said third polarized collection of beams toward said receivers; and stacking said reflector and said combiner.

19. The method of optical switching according to claim 18, wherein said first polarized collection of beams, said second polarized collection of beams, and said third polarized collection of beams each have N rays, and said receivers comprise 3N receivers.

20. An optical switching arrangement, comprising:

an output beam receiver having a limited beam acceptance angular cone corresponding to a finite numerical aperture;

a plurality of stacked switching subassemblies, said stacked switching subassemblies producing a combined output beam directed toward said output beam receiver, each of said stacked switching subassemblies comprising:

a first deflector module, comprising a plurality of first optical deflectors that emits a first polarized collection of beams, said first polarized collection of beams carrying a first plurality of optical information carrying channels bearing first information, said first plurality of optical information carrying channels having a first total divergence;

a second deflector module, comprising a plurality of second optical deflectors that emits a second polarized collection of beams, said second polarized collection of beams carrying a second plurality of optical information carrying channels, independent of and different from said first optical information carrying channels, bearing second information different from said first information, said second plurality of optical information carrying channels having a second total divergence, an algebraic sum of said first and second total divergences exceeding said limited beam acceptance angular cone corresponding to a finite numerical aperture of said optical beam receiver; and a polarization beam combiner, disposed in a first light path of said first polarized collection of beams and in a second light path of said second polarized collection of beams that combines said first polarized collection of beams and said second polarized collection of beams into a common beam, said common beam being a portion of said combined output beam, wherein a first polarization of said first polarized collection of beams is orthogonal to a second polarization of said second polarized collection of beams at said polarization beam combiner, said common beam having a total divergence which does not exceed said limited beam acceptance angular cone corresponding to a finite numerical aperture of said optical beam receiver and does not exceed the larger of said first total divergence and said second total divergence.

21. The optical switching arrangement according to claim 20, wherein said output receiver comprises an array of receivers.

22. The optical switching arrangement according to claim 20, further comprising optics disposed in said combined output beam for focusing said combined output beam on said output receiver.

23. The optical switching arrangement according to claim 20, wherein said first deflector module and said second deflector module emit light having an identical polarization, further comprising a half-wave polarization plate disposed in said first light path.

24. The optical switching arrangement according to claim 23, further comprising optics disposed in said combined output beam for focusing said combined output beam on said output receiver.

25. The optical switching arrangement according to claim 20, wherein a polarization of light emitted by said first deflector module is orthogonal to a polarization of light emitted by said second deflector module.

26. The optical switching arrangement according to claim 20, wherein at least a portion of said first light path is perpendicular to a portion of said second light path.

* * * * *